United States Patent
Burkhard

(10) Patent No.: US 7,293,643 B2
(45) Date of Patent: Nov. 13, 2007

(54) PLATE LINK CHAIN HAVING INNER AND OUTER PLATE MEMBERS

(75) Inventor: Poppeck Burkhard, Duisburg (DE)

(73) Assignee: Aumond-Fördererbau GmbH & Co. KG (DE)

(*) Notice: Subject to any disclaimer, the term of this patent is extended or adjusted under 35 U.S.C. 154(b) by 126 days.

(21) Appl. No.: 10/546,381

(22) PCT Filed: Dec. 17, 2003

(86) PCT No.: PCT/EP03/14412

§ 371 (c)(1),
(2), (4) Date: Jun. 10, 2005

(87) PCT Pub. No.: WO2004/072508

PCT Pub. Date: Aug. 26, 2004

(65) Prior Publication Data

US 2006/0196755 A1    Sep. 7, 2006

(30) Foreign Application Priority Data

Feb. 11, 2003  (DE) .................... 203 02 130 U

(51) Int. Cl.
*B65G 17/38* (2006.01)

(52) U.S. Cl. ...................... 198/850; 198/712

(58) Field of Classification Search .......... 198/712, 198/850, 851, 711, 817, 853

See application file for complete search history.

(56) References Cited

U.S. PATENT DOCUMENTS

| 1,422,151 | A | * | 7/1922 | Walker ................... 198/712 |
| 1,694,746 | A | | 12/1928 | Landahl |
| 3,765,458 | A | * | 10/1973 | Ziegler et al. ......... 198/867.11 |
| 3,967,721 | A | * | 7/1976 | Rhoden .................... 198/850 |
| 4,358,010 | A | * | 11/1982 | Besch ...................... 198/851 |
| 5,429,226 | A | * | 7/1995 | Ensch et al. ........... 198/803.14 |
| 6,945,388 | B2 | * | 9/2005 | Schumacher ............... 198/851 |

* cited by examiner

*Primary Examiner*—James R. Bidwell
(74) *Attorney, Agent, or Firm*—Robert W. Becker; Robert W. Becker & Associates

(57) ABSTRACT

A plate link chain in the form of a conveyor chain comprising at least two chain strands that are disposed parallel to one another and are comprised of a sequence of inner plate members and outer plate members, wherein the inner plate members are provided with openings for receiving at least one sleeve for connecting the inner plate members of oppositely disposed chain strands, wherein the outer plate members are provided with openings aligned with the openings of the inner plate members to receive a link pin that extends through the sleeve and is fixed on the outer plate members, and wherein the inner plate members are comprised of at least two individual plates, one of which, of at least the inner plate members of one chain strand, is provided with angle brackets for the mounting of further chain components.

8 Claims, 1 Drawing Sheet

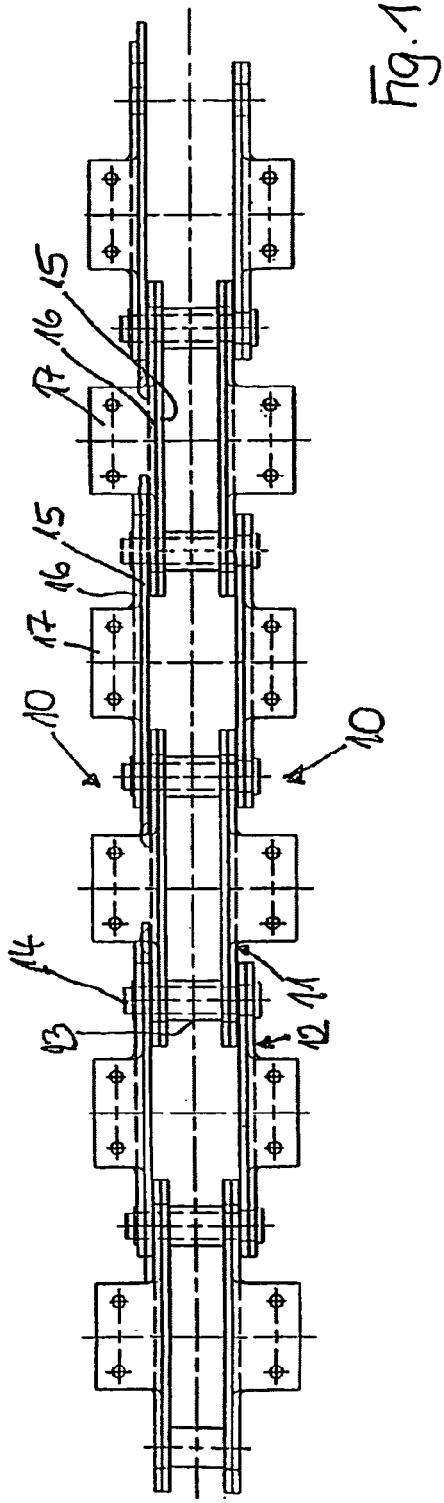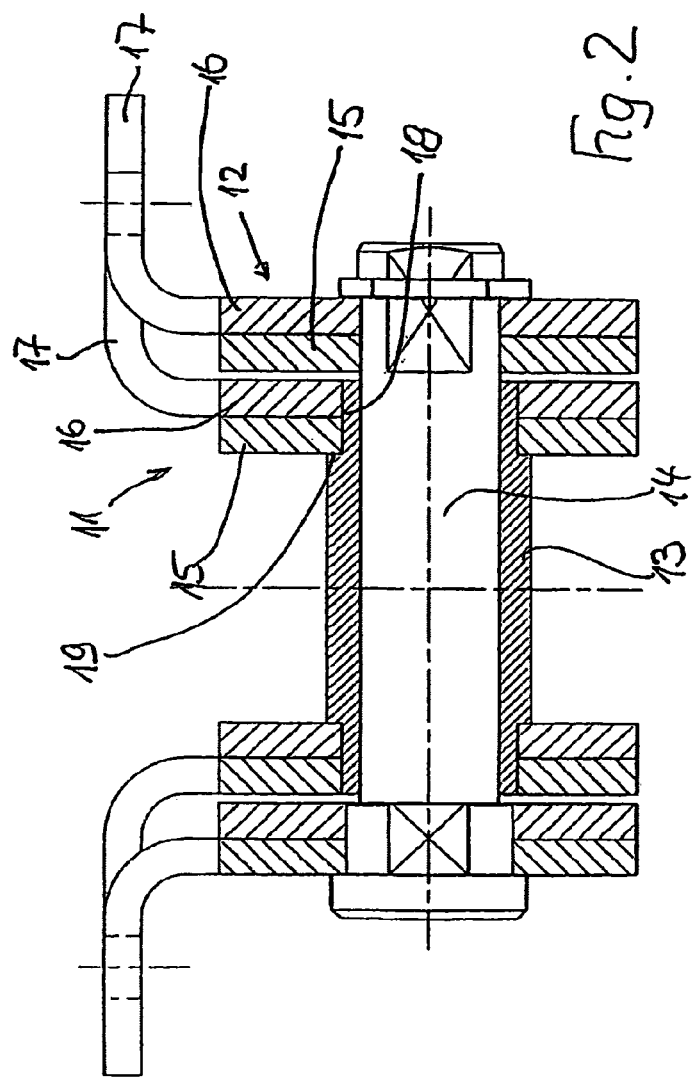

PLATE LINK CHAIN HAVING INNER AND OUTER PLATE MEMBERS

This specification for the instant application should be granted the priority date of Feb. 11, 2003, the filing date of the corresponding German Patent application 203 02 130.4 as well as the priority date of 17 Dec. 2003, the filing date of the corresponding International patent application PCT/EP2003/014412.

BACKGROUND OF THE INVENTION

The invention relates to a plate link chain in the form of a conveyor chain, especially for platform or apron conveyors, bucket conveyors, or similar conveying means, comprised of at least two chain strands that are disposed parallel to one another and are comprised of a sequence of inner plate members and outer plate members, whereby the inner plate members are provided with openings for receiving at least one sleeve for connecting the inner plate members of the oppositely disposed chain strands, and the outer plate members are provided with openings that are lined with the openings of the inner plate members in order to receive a link pin that extends through the sleeve and is fixed on the outer plate members, and at least the inner plate members and/or the outer plate members that form one chain strand are provided with angle brackets for the mounting of further components of the conveying means.

A plate link chain having the aforementioned features is described in DIN Standard 8167 as well as in DIN Standard 8175. Such plate link chains have the problem that the maximum tensile load of the chain that can be taken up is determined by the weakest chain element, i.e. the inner plate member, the outer plate member, the sleeve or the link pin. In this connection, experience has shown that with the state of the art plate link chains, the inner plate member having the bore for receiving the chain sleeve, which bore weakens the cross-sectional area of the inner plate member, represents the weak point of a state of the art plate link chain. To the extent within the scope of the known manufacturing processes the plates are manufactured from rolled metal plate by stamping, shearing or laser cutting, out of economical reasons these manufacturing processes permit only a specific plate thickness, as a result of which the maximum permissible tensile load of the plate link chain is also limited. If greater tensile loads of the chain are necessary, disproportionately process-intensive, and hence expensive, forged chains are used.

To the extent that with the plate link chain described in GB 193 547 components such as angle brackets that are to be attached are placed upon additionally arranged bolts, the problem presented with regard to the configuration of the inner plate members that carry the sleeves is not eliminated thereby.

Known from GB 2 135 018 A, U.S. Pat. No. 1,694,746 and JP60-191903 are roller chains with which a shaft that carries the respective roller is likewise carried in the inner plate members and outer plate members of the chain, which to this extent are appropriately embodied the same; there thus does not result a differing loading of the inner of the members and outer plate members.

It is therefore an object of the invention, with a plate link chain having the aforementioned features, to provide a uniform loading of all elements of the chain, and possibly to increase the permissible tensile load of the chain.

SUMMARY OF THE INVENTION

The basic concept of the invention is that the inner plate members of the plate link chain are comprised of at least two individual plates, of which one individual plate is provided with the angle bracket.

The invention has the advantage that the thickness of the material of the individual plates can be limited to a value that enables an economical manufacture without thereby limiting the permissible tensile load of the chain; rather, the tensile load of the chain can be increased while using two or more, in other words three or four or a number of individual plates that is advantageous in the technical design of the plate link chain for the respective formation of an inner plate member. Since only one individual plate is connected with the angle bracket, the manufacture of this individual plate is also facilitated, since the loading of the plate link chain by the further components of the conveying means mounted on the angle brackets is less than the tensile loading that exists in the chain. Thus, the inventively configured chain respectively has the best material utilization coefficients.

Pursuant to one embodiment of the invention, the angle bracket is monolithically formed with the individual plate that carries it, whereby the angle bracket is produced directly by bending, pressing, or some other appropriate manufacturing process. This embodiment has the special advantage that it is no longer necessary to deform the entire thickness of the corresponding plate of the chain, but rather that the appropriate forming process is limited to the individual plate that carries the angle bracket and has a limited material thickness.

Pursuant to another embodiment of the invention, the inner plate members and outer plate members that form a chain strand are respectively formed with an overall thickness that is formed by a different number of individual plates. The invention thus permits, in an advantageous manner, the inner plate members of a chain strand to have a greater material thickness by using a greater number of individual plates relative to the outer plate members of the same chain strand; in this connection, the invention does not preclude the outer plate members of a chain strand, which alternate with the inner plate members that are composed of a plurality of individual plates, from being comprised of a single individual plate.

If, pursuant to one embodiment of the invention, the individual plates that are used for the construction of the inner plate members have a different material thickness, there results thereby a greater freedom with regard to the dimensioning of the material thickness of the inner plate members or the outer plate members. Thus, thinner individual plates that alternate with thicker individual plates can be combined to form an outer plate member or an inner plate member.

Pursuant to another embodiment of the invention, the individual plates are interconnected to form an inner plate member or an outer plate member, whereby the individual plates can be interconnected in an adhesive manner or some other manner.

The inner plate members and/or the outer plate members that form the two chain strands can be provided with angle brackets.

BRIEF DESCRIPTION OF THE DRAWINGS

One embodiment of the invention is shown in the drawing and is described subsequently. The drawing shows:

FIG. 1 a plan view upon a portion of a plate link chain,

FIG. 2 a cross-sectional view taken along the line II-II in FIG. 1.

DESCRIPTION OF SPECIFIC EMBODIMENTS

The plate link chain illustrated in FIG. 1 is comprised of two chain strands 10 that are disposed parallel to one another, whereby each chain strand 10 is formed of a sequence of inner plate members 11 and outer plate members 12. The oppositely disposed inner plate members 11 and outer plate members 12 of the two chain strands 10 are respectively interconnected by sleeves 13 that connect the inner plate members 11, and link pins 14 that are inserted into the sleeves 13 through associated openings of the outer plate members 12.

As already apparent from FIG. 1, the inner plate members 11 and outer plate members 12 of the two chain strands 10 are each uniformly comprised of two parallel individual plates that are disposed on the sleeves 13 or the link pins 14, whereby in each case an inner individual plate 15 and an outer individual plate 16 are provided; the outer individual plates 16 are monolithically formed with an angle bracket 17 for the mounting of further components of the conveying means, for example for the mounting of buckets when the plate link chain is used for a bucket conveyor.

The composition of the inner plate members 11 and outer plate members 12 can be seen in detail in FIG. 2. To fix the position of the inner plate members 11, the outer ends of the sleeve 13 are respectively provided with a recess 18 that has a smaller diameter and that forms a shoulder 19. Two individual plates, and in particular an inner individual plate 15 and an individual plate 16 that is monolithically formed with an angle bracket 17, are placed onto the recess 18 in such a way that the inner plate member 11, which is formed from the individual plates 15, 16, rests against the shoulder 19 of the sleeve 13. In a corresponding manner, the outer plate member 12, which is disposed on the link pin that extends through the sleeve 13, is also respectively comprised of two individual plates that are placed upon the link pin 14, and in particular again of an inner plate 15 and an individual plate 16 that is monolithically formed with an angle bracket 17.

The invention is not limited to the illustrated embodiment having an identical composition of inner plate members and outer plate members; rather, a different number of individual plates 15 or 16 for forming the inner plate member 11 or the outer plate member 12 is respectively also conceivable.

The features disclosed in the preceding description, the patent claims, the abstract and the drawing can be important individually as well as in any desired combination with one another for realizing the various embodiments of the invention.

The specification incorporates by reference the disclosure of German priority document 203 02 130.4 filed Feb. 11, 2003 and PCT/EP2003/014412 filed Dec. 17, 2003.

The present invention is, of course, in no way restricted to the specific disclosure of the specification and drawings, but also encompasses any modifications within the scope of the appended claims.

The invention claimed is:

1. A plate link chain in the form of a conveyor chain, comprising:
   at least two chain strands that are disposed parallel to one another and are composed of a sequence of inner plate members and outer plate members, wherein the inner plate members are provided with openings for receiving at least one sleeve for connecting the inner plate members of oppositely disposed ones of said chain strands, wherein the outer plate members are provided with openings that are aligned with the openings of the inner plate members in order to receive a link pin that extends through the sleeve and is fixed on the outer plate members, wherein the inner plate members of the plate link chain are comprised of at least two individual plates and wherein one of the individual plates of at least the inner plate members of one of the chain strands is provided with angle brackets for a mounting of further chain components.

2. A plate link chain according to claim 1, wherein the angle brackets are monolithically formed with the individual plates that carry them.

3. A plate link chain according to claim 1, wherein the inner plate members and the outer plate members that form the one of the chain strands respectively have an overall thickness formed by a different number of the individual plates.

4. A plate link chain according to claim 1, wherein the individual plates that comprise the inner plate members have a different material thickness.

5. A plate link chain according to claim 1, wherein the individual plates are interconnected to form an inner plate member.

6. A plate link chain according to claim 1, wherein the inner plate members that form the at least two chain strands are provided with angle brackets.

7. A plate link chain according to claim 1, wherein the outer plate members are comprised of a single individual plate that is provided with angle brackets.

8. A plate link chain according to claim 1, wherein the outer plate members are comprised of at least two individual plates and wherein one of the individual plates is provided with an angle bracket.

* * * * *